Feb. 21, 1928.

C. H. FULLER 1,660,156

FRICTION DEVICE

Filed March 29, 1926

2 Sheets-Sheet 1

INVENTOR
C. H. FULLER
BY Birkenbeuel
ATTORNEY.

Feb. 21, 1928. 1,660,156

C. H. FULLER

FRICTION DEVICE

Filed March 29, 1926  2 Sheets-Sheet 2

INVENTOR
C. H. FULLER
BY
ATTORNEY.

Patented Feb. 21, 1928.

1,660,156

UNITED STATES PATENT OFFICE.

CHARLES H. FULLER, OF PORTLAND, OREGON.

FRICTION DEVICE.

Application filed March 29, 1926. Serial No. 98,111.

This invention relates generally to friction devices for transmitting power, and particularly to a special form of friction device which is well adapted for use in connection with winches, hoists and other machinery.

The first object of this invention is to provide an exceedingly simple and efficient friction mechanism which can be used in connection with a great variety of mechanical devices.

Figure 2:
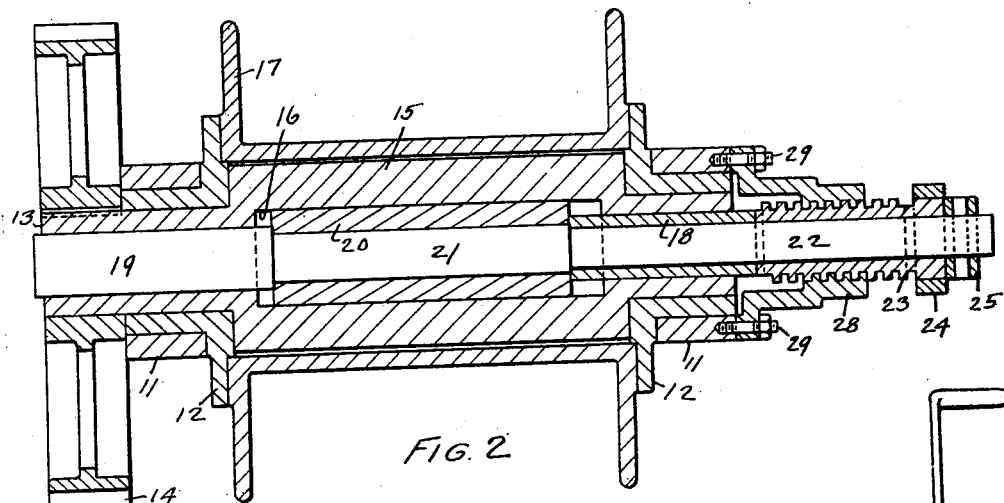
Figure 1:
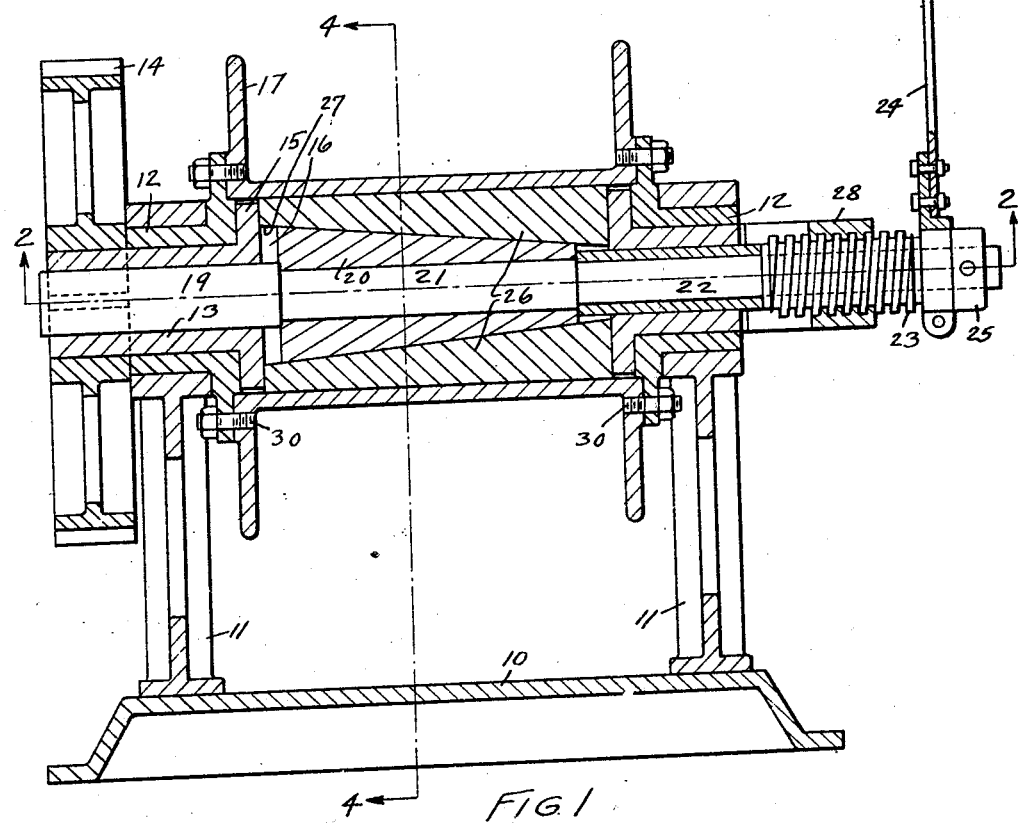
Figure 3:
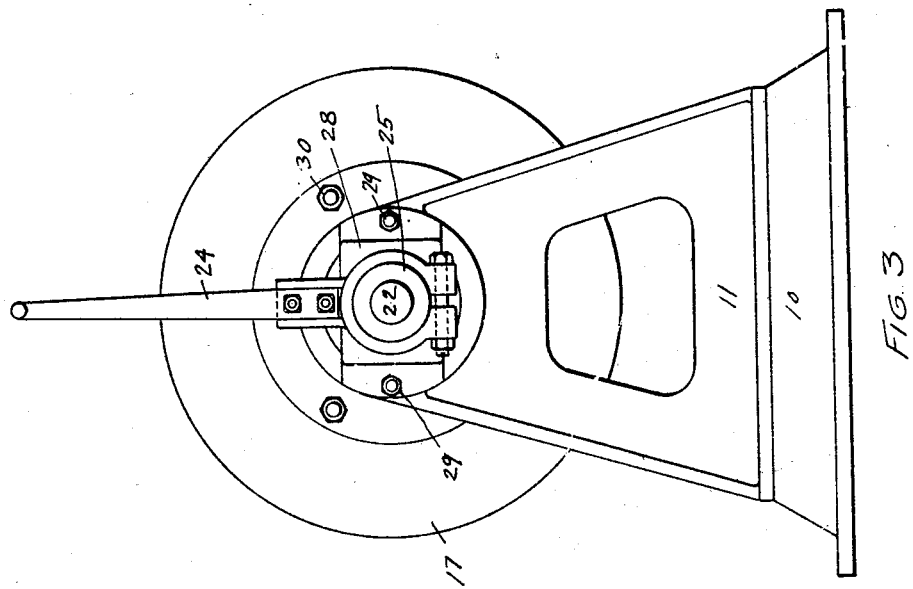
Figure 4:
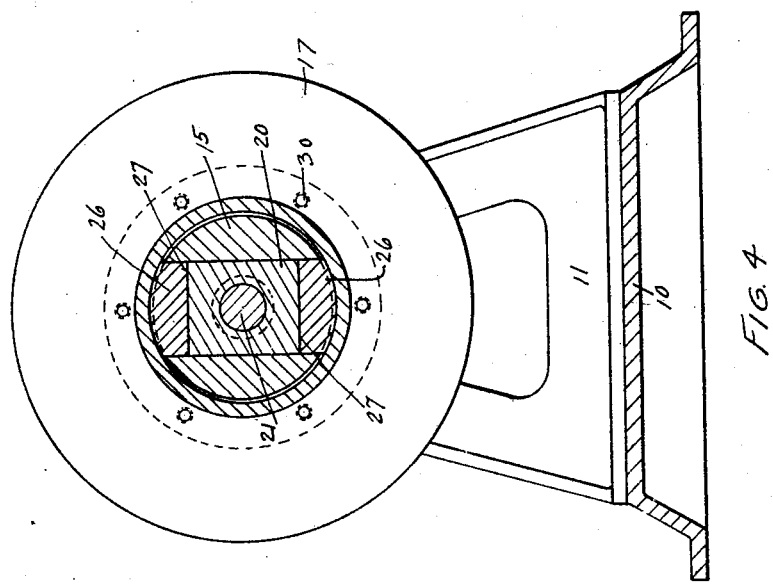

I accomplish this object in the manner set forth in the following specification as illustrated in the accompanying drawings, in which:

Figure 1 is a vertical longitudinal section through the device. Figure 2 is a horizontal longitudinal section taken along the line 2—2 in Figure 1. Figure 3 is an end elevation from the crank end of the device. Figure 4 is a vertical transverse section taken along the line 4—4 in Figure 1.

Similar numbers of reference refer to the same parts throughout the several views.

Referring in detail to the drawings, in order to illustrate the invention in its simplest form there is shown a base 10 on which are mounted the upright standards 11. In each upright standard is journaled a flanged sleeve 12 which, in turn, act as bearings for the hollow shaft 13 on the outer portion of which is secured the gear 14 or sprocket or pulley or drum as may be required. The portion 15 of the shaft 13 is provided with a slot 16. Between the flanges of the members 12 and surrounding the enlarged portion 15 of the shaft 13 is a drum 17 whose bore is somewhat larger than the external diameter of the portion 15.

In one end of the shaft 13 is placed a sleeve 18. The central shaft 19 is provided with a wedge 20 on its reduced diameter 21, which wedge is held between the largest portion of the shaft 19 and the sleeve 18. Outside of the sleeve 18 on the still further reduced diameter 22 is rotatably placed a screw 23 provided with a lever 24, outside of which is pinned a collar 25 to the shaft 19.

In the slot 16, between the wedge 20 and the drum 17, are placed the clutch jaws 26 whose inner sides 27 engage the inclined faces of the wedge 20. The screw 23 is threaded into the bracket 28 which is secured to a standard 11 by means of the bolts 29.

The drum 17 is attached between the flanged sleeves 12 by means of the bolts 30. The shaft 19 can be moved longitudinally by rotating same since its threaded portion 23 is carried by the stationary bracket 28. The wedge 20 is rotatable with relation to the shaft 19 but is not movable longitudinally in relation to this shaft. It follows that the rotation of the shaft 19 will cause the wedge 20 to move longitudinally and incidentally move the jaws 26 inwardly or outwardly as the case may be.

Obviously the drum 17 can be replaced by a gear, sprocket or pulley and may be either the driver or the driven element in the device without departing from the spirit of this invention. Also that the form in which it is herein shown is only representative of one of the many manners in which it may be employed, and is intended to show its principle rather than its particular application to any special apparatus.

The operation of the device is as follows: If it is desired to transmit power between the gear 14 and the drum 17 the operator merely rotates the lever 24 in a direction which will cause the shaft 19 to move the wedge 20 to force the clutch jaws 26 outwardly against the bore of the drum 17. Since the members 20 and 26 are confined within the slot 16 they, in reality, act as a giant key between the drum 17 and the shaft 19. To release the frictional engagement between the members 14 and 17 the lever 24 is merely rotated in the opposite direction.

It will be seen that owing to the angularity of the wedge 20 and its associated parts that when once friction is applied to the device that no great thrust need be continued to maintain this friction, which is a common fault in most devices of this character. On the contrary, an opposite thrust is required to release the friction when this action is desired.

I am aware that many forms of friction devices have been constructed in the past; therefore I do not intend to cover such devices broadly, but I do intend to cover all such forms and modifications thereof as fall fairly within the appended claim.

I claim:

The combination of a base having two upright standards having mounted between same a rotatable member with a cylindrical bore and having a hollow trunnion at each end thereof journaling in said standards;

a hollow shaft journaling at each end in one of said trunnions and having an enlarged central portion within said cylindrical bore, said central portion having a slot therethrough; a slidable shaft within said hollow shaft; a screw member for sliding said hollow shaft longitudinally; a wedge rotatably mounted on said slidable shaft and in relation thereto and adapted to be moved endwise thereby; a clutch jaw on each sloping side of said wedge adapted to be brought into engagement with said rotatable member by an endwise movement of said wedge and to be withdrawn from such engagement by an opposite movement of said wedge.

CHARLES H. FULLER.